Dec. 6, 1927.
W. C. SPROESSER
VISCOSITY GAUGE
Filed Sept. 5, 1923
1,651,416
FIG_1.
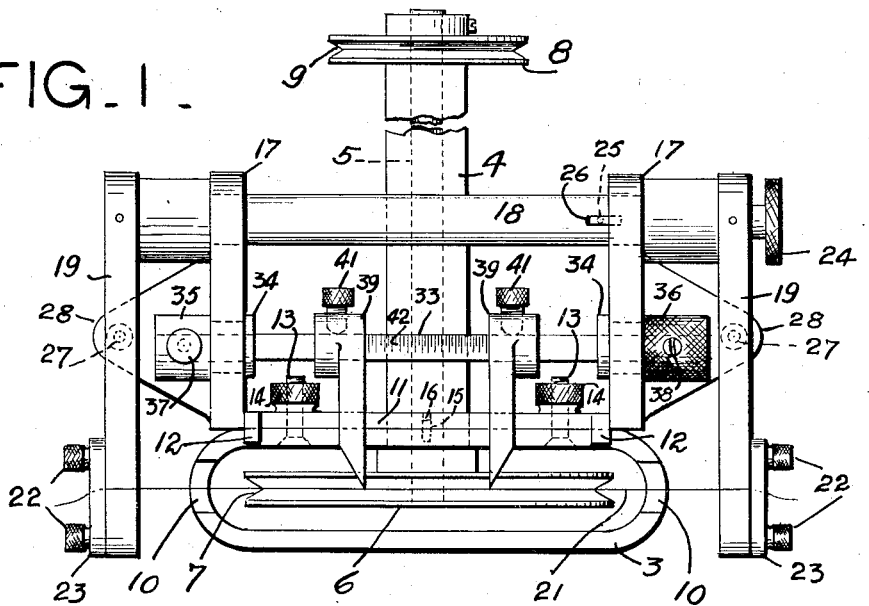
FIG_2.
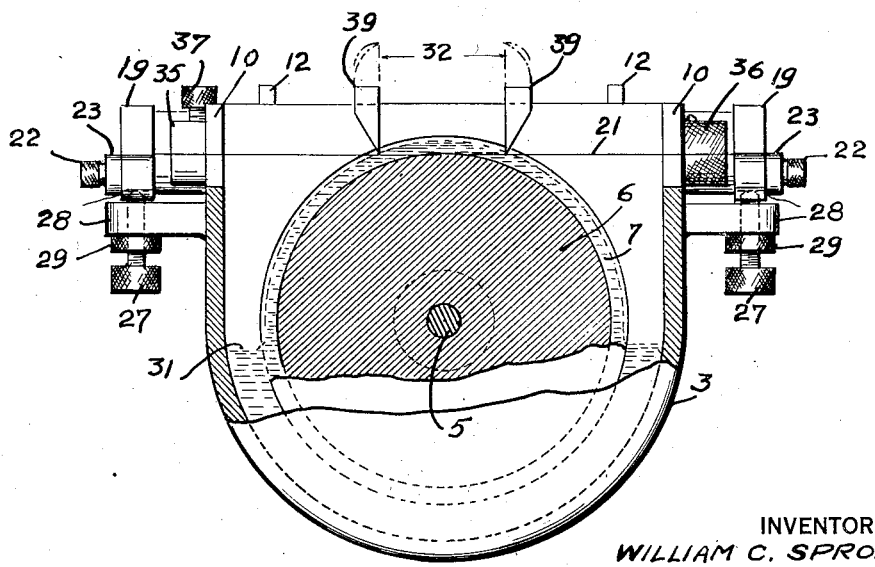
INVENTOR
WILLIAM C. SPROESSER
BY
ATTORNEY Patented Dec. 6, 1927.

1,651,416

UNITED STATES PATENT OFFICE.

WILLIAM CHARLES SPROESSER, OF BLOOMFIELD, NEW JERSEY, ASSIGNOR TO WESTINGHOUSE LAMP COMPANY, A CORPORATION OF PENNSYLVANIA.

VISCOSITY GAUGE.

Application filed September 5, 1923. Serial No. 661,118.

This invention relates to gauges for measuring the viscosity of liquids and more particularly to a device for indicating the viscosity of getter or binder liquids, so the amount thereof applied to filamentary material may be accurately controlled.

An object of my invention is the accurate control of the amount of getter or binder liquid applied to filamentary material, so that uniform results may be obtained in using such material.

Another object of my invention is to gauge the viscosity of getter and binder liquids, as the same are applied to filamentary material, so that such viscosity may be maintained uniform whereby the amount of getter and binder liquid applied to such material may be accurately predetermined.

A further object of my invention is the predetermination and control of the amount of getter or other liquid applied to filamentary material, by employing a viscosity gauge or "immersimeter" attached to the getter wheel housing or the like, for the purpose of measuring the "getter length" or the like, that is, the immersed length of a taut substantially horizontal wire held tangent to the bottom of the groove in the getter wheel at its highest point.

A still further object of my invention is the employment of a taut wire immersed in the stream of a wetted groove in the periphery of a gettering wheel or the like, to indicate the viscosity of the getter or other liquid and thereby show indirectly the amount of material being applied to such filament by said wheel, by the length of wire immersed in said stream.

Other objects and advantages of the invention will become apparent upon reading the following description.

A usual method of applying getter and binder material to wire or filament used in the manufacture of incandescent electric lamps is to draw such wire through a stream of liquid carried in a groove in the periphery of a rotating wheel partly immersed in the desired getter or binder liquid. The amount of active getter applied to a wire or filament by such a method depends on several factors such as the concentration of the getter material in the liquid vehicle carrying the same, the viscosity of the mixture or suspension, the speed at which the wire or filament is drawn through the wetted groove in the getter wheel, the depth of getter liquid in the cup surrounding the getter wheel and the speed of rotation of the getter wheel.

All of the foregoing factors with the exception of the viscosity of the getter or other liquid used, are readily controlled; however, because of the volatility of part of the getter liquid, its viscosity increases on standing and it is necessary to replace the vaporized constituent from time to time to maintain the viscosity of the liquid substantially uniform. Because of the fact that the viscosity of the liquid in the getter cup has not been readily determinable while the device is in operation, uniform results in the application of getter to filamentary material by such a method have not been obtained.

According to my invention I obviate the non-uniform application of getter or other liquid to filamentary material, because of changes in the viscosity thereof, by providing a device attached directly to the getter cup for indicating the viscosity of the getter liquid and thereby showing indirectly the amount of getter being applied to the filamentary material undergoing treatment. It is well known that as the getter wheel revolves while partly immersed in, for example, the getter liquid, a certain amount of the liquid is picked up and revolved with the wheel and the depth of the liquid in the peripheral groove of the wheel depends on the depth to which the wheel is immersed in the liquid, the speed of rotation of the wheel and the viscosity of the liquid. By making the first two factors constant, it will be seen that the depth of the liquid in the groove in the periphery of the wheel is a function of the viscosity of the liquid.

Although the viscosity of the liquid may be determined by measuring this depth radially, yet it is more convenient and accurate to measure the same tangentially, that is, by means of a wire or filament held preferably substantially horizontal and approximately tangent at the bottom of the peripheral groove in the getter wheel at approximately its highest point. The length of the liquid measured tangentially in the groove is therefore indicated by the length of the wetted portion of the wire.

By proper calibration, the viscosity of the liquid when the wheel speed and getter depth in the cup is maintained constant, may be determined by directly reading the "getter length" or length of the wetted portion of the wire. I call the device constructed for the foregoing purpose and embodying the principles of my invention an "immersimeter," because it measures the immersed length of a wire held taut, substantially horizontal and tangent in the wetted groove of a getter wheel.

My invention will better be understood by the following more detailed description thereof in connection with the accompanying drawings.

Although I will describe my invention particularly with reference to applying getter to filamentary material, it is to be understood that such is merely illustrative and that my device is adapted for measuring the viscosity of any liquid. It is also adapted for controlling the application of binder liquid or a suspension of material for increasing the electron emissivity of filamentary material, for example, a suspension of alkaline earth material; or any other liquid, whether a mixture, a suspension or a solution, where a constituent thereof is volatile and the loss thereof changes the viscosity of the remaining portion.

Referring to the accompanying drawing; Fig. 1 is a plan view of a getter cup enclosing a gettering wheel revolubly mounted and a device embodying the principles of my invention attached to said cup; and Fig. 2 is a side elevation, partly broken away, of the apparatus illustrated in Fig. 1.

The getter cup 3 illustrated in the drawing may be suitably held in any desired manner as by means of the extended bearing 4 attached thereto. Rotatably mounted in the bearing 4, on a journal or shaft 5 is a getter wheel 6 provided with a peripheral, preferably V-shaped, groove 7. The opposite end of the shaft or journal 5 has preferably fixed thereto, a pulley or sheave 8, preferably provided with a V-shaped peripheral groove 9, for the purpose of driving the getter wheel 6. The getter cup 3 is preferably provided with notches 10 to permit wire or filamentary material to be drawn along or over and around the groove 7 in the gettering wheel 6.

Apparatus constructed in accordance with my invention may be attached directly to the getter cup 3 in any desired manner and, as shown in the drawing, may comprise a plate 11 provided with lugs 12 engaging the upper edge of a wall of the getter cup 3, attached to said wall by means of studs 13 and thumb nuts 14 engaging slotted portions of the plate 11 and stud 15 engaging aperture 16 in the plate 11. The plate 11, as shown, is provided with bracket arms 17 in the outer ends of which is rotatably mounted a shaft 18 to which are rigidly fastened arms 19 provided with means for stretching or holding taut a wire or filament 21 therebetween. Such holding means may take any desired form and, as shown, comprise thumb screws 22 engaging clamping plates 23. The arms 19 may be manually actuated by means of a knurled head 24 rigidly attached to shaft 18.

Shaft 18 and its attached arms are allowed to rotate approximately 180° and prevented from further rotation in one direction by engagement between stud 25 on shaft 18 and stud 26 on one of the bracket arms 17. Movement in the opposite direction is restricted by the engagement of arms 19 with adjusting thumb screws 27 in extensions 28 on bracket arms 17. Adjusting thumb screws 27 with lock nuts 29, as shown, are preferably provided and by suitably adjusting such thumb screws, the movement of the arms 19 are so restricted that when in an extreme position, which may be designated as a forward position, a wire 21 held between said arms is supported substantially tangent to the getter wheel 6, at the bottom of the peripheral groove 7 therein.

This wire 21 is the means for gauging the viscosity of the getter or other liquid 31 which, as shown in Fig. 2, is drawn around in the peripheral groove in the getter wheel 6 when the wheel is rotated and wets the wire 21 for a certain distance 32, which depends on certain factors which will be hereinafter enumerated. The distance 32 may be measured in any desired manner and a preferred means for this purpose is illustrated in the drawing.

A shaft 33 of non-circular and preferably square cross-section is inserted in cylindrical flanged bushings 34 by means of which said shaft is rotatably mounted in and between bracket arms 17. The shaft may be held in place and prevented from longitudinal movement by means of collars 35 and 36, the collar 35 being shown as held in place by means of thumb screw 37 and the collar 36, which is shown as being knurled for manual manipulation, being held in place by a machine screw 38.

Mounted on the shaft 33 are calipering arms 39 adapted to be adjusted and held in place thereon by means of thumb screws 41. The shaft 33 may have graduations 42 marked thereon, for the purpose of reading directly the distance between the calipering ends of the arms 39. The arms 39 may be raised or lowered to position by manually turning the knurled collar 36.

The operation of my device or immersimeter is as follows: The getter cup 3 has placed therein, the desired quantity of getter or other liquid 31 to a definite predetermined height or depth therein, which may be readily determined by any preferred gauging means, the main point being that the level thereof is maintained constant and is preferably slightly below the journal 5. The getter liquid is prepared of such a consistency that the viscosity thereof is sufficient for the purpose desired and the same may be decreased by adding a liquid, such as an ether-alcohol mixture or the like, to decrease the viscosity to the desired degree. The getter wheel 6 is rotated at a definite predetermined speed by means of its pulley 8 from a suitable source of power, not shown. This results in a stream of the getter liquid 31 being drawn over and around in the groove 7 of the getter wheel as shown in Fig. 2, the depth in said groove depending on the viscosity of the liquid, the depth thereof in the cup and the speed of rotation of the wheel.

The depth of getter in the cup is maintained constant as well as the speed of rotation and the viscosity is thereby indicated by the wetted length of the wire 21 stretched tangent at the bottom of the groove 7 in the wheel 6. The length immersed or wetted length of the wire therefore becomes a function of the viscosity of the getter liquid and the viscosity or consistency of such liquid is regulated by the addition of more or less of a volatile constituent thereof until the wetted length of wire, as measured by calipering arms 39 becomes such an amount as indicates the desired viscosity of the getter liquid.

Of course, the device must be calibrated by trials so that a definite distance between calipering arms, in measuring the wetted length of wire 21, means that a definite weight of getter is applied to filamentary material of a definite size drawn therethrough at a definite speed, when the wheel 6 is revolved at a definite speed in liquid of a definite depth. It will therefore be apparent that the device should first be actuated for applying getter to filament or wire under definite conditions and readings taken of the different factors involved so that the device may be accurately calibrated to show the amount of getter which is applied for each getter length measured by the calipering arms 39. When this has been done, it is only necessary to set the calipering arms the desired distance apart and while maintaining the getter at a definite level in the cup, regulate the viscosity or consistency of the liquid so that the wetted length of wire 21 therein corresponds to the desired distance at which the calipering arms 39 are set.

Although the filament 21 is shown in place in the groove 7 of the gettering wheel 6, it is preferable when applying getter to filamentary material to swing the arms 19 back to carry the wire 21 out of the groove 7, so as not to interfere with the travel of the filamentary material therethrough. This also applies to the calipering arms 39. The viscosity of the getter liquid may therefore be gauged or measured by this method before running the filament to be gettered over the wheel and from time to time during this operation, it not being necessary to read the getter length continuously with the device, although it is possible to do this when performing certain coating operations on wire or filamentary material.

In applying other material besides getter liquid to wire or filamentary material, the same procedure may be used with my device and the foregoing description with respect to getter liquid is illustrative of the application of any desired liquid to wire or filamentary material, whether such liquid be a single substance, a mixture, a suspension or a solution.

Although I have described what is now considered a preferred embodiment of my invention, it is to be understood that the same is merely illustrative and that modifications may occur to those skilled in the art within the spirit and scope of the appended claims.

What is claimed is:

1. The steps in the method of gauging the viscosity of a liquid comprising revolving at a constant speed, a grooved wheel partly immersed in the liquid and measuring the length of a segment of the liquid in the groove on a line making a fixed angle to the vertical and tangent to the bottom of the groove at a point at a known distance above the surface of the liquid in the container.

2. The steps in the method of determining the viscosity of a liquid comprising partly immersing a groove wheel therein, stretching a substantially horizontal wire in the groove and substantially tangent to the bottom thereof at approximately its highest point and making a fixed angle to the vertical and measuring the wetted length of the wire when the wheel is rotated.

3. A device for determining the viscosity of a liquid comprising a container having a liquid therein, a bearing associated with the container, a wheel provided with a peripheral groove mounted in said bearing, means for rotating said wheel while partly immersed in said liquid to carry a stream thereof in the groove, a wire, means for supporting the wire in said stream tangent to the bottom of the groove at its highest point, and means for measuring the immersed length of the wire.

4. A device for indicating the viscosity of a liquid comprising a container having a liquid therein, a bearing associated with the container, a wheel provided with a peripheral groove mounted in said bearing, means for rotating the wheel while partly immersed in said liquid, a filament means for supporting the filament in a substantially horizontal position and approximately tangent to the top of the wheel and at the bottom of the groove therein, and a calipering means for measuring the immersed length of the filament.

5. A device for gauging the viscosity of a liquid, comprising a cup for said liquid, a wheel having a peripheral groove, means for rotating said wheel in said cup with a portion of the wheel immersed in said liquid, a shaft, arms rotatable about the axis of said shaft, a wire supported by said arms and disposed in a substantially horizontal position tangent to the upper surface of the wheel, said arms being adapted to move the wire into the groove of said wheel or out from said groove, and means for measuring the wetted length of wire while in said groove.

6. A device for gauging the viscosity of a liquid comprising a cup for said liquid, a wheel having a peripheral groove, means for rotatably mounting said wheel in said cup with a portion of the wheel immersed in said liquid, means for rotating said wheel, a shaft, arms mounted on said shaft and rotatable about the axis thereof, a wire supported by said arms in a substantially horizontal position tangent to the upper surface of the wheel and adapted to be moved either into the groove of said wheel or away from said wheel, a rod disposed adjacent to said cup, and calipering elements slidably mounted on said rod for independent longitudinal movement for adjustment, and means for moving said elements toward and away from said wire.

In testimony whereof, I have hereunto subscribed by name this 28th day of August, 1923.

WILLIAM CHARLES SPROESSER.